United States Patent
Ide et al.

(10) Patent No.: US 9,731,981 B2
(45) Date of Patent: Aug. 15, 2017

(54) RARE EARTH ADSORBENT AND RARE EARTH ADSORPTION METHOD USING THE SAME

(71) Applicant: Kabushiki Kaisha Toshiba, Minato-ku (JP)

(72) Inventors: Tomohito Ide, Tokyo (JP); Akiko Suzuki, Tokyo (JP); Toshihiro Imada, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/996,540

(22) Filed: Jan. 15, 2016

(65) Prior Publication Data

US 2016/0207793 A1    Jul. 21, 2016

(30) Foreign Application Priority Data

Jan. 16, 2015    (JP) ................. 2015-006283

(51) Int. Cl.
  *C02F 1/28* (2006.01)
  *B01J 20/26* (2006.01)
  *C02F 101/10* (2006.01)

(52) U.S. Cl.
  CPC ............. *C02F 1/285* (2013.01); *B01J 20/265* (2013.01); *C02F 2101/10* (2013.01); *C02F 2209/06* (2013.01)

(58) Field of Classification Search
  CPC .. C02F 1/285; C02F 2101/10; C02F 2209/06; B01J 20/265
  USPC ........................................................ 210/681
  See application file for complete search history.

(56) References Cited

U.S. PATENT DOCUMENTS

2009/0134008 A1* 5/2009 White .................... B01D 15/00
                                                    204/157.42

FOREIGN PATENT DOCUMENTS

| JP | 61-270216 A | * 11/1986 |
| JP | 7-100371 A | 4/1995 |
| JP | 2005-152756 A | 6/2005 |
| JP | 2013-213272 A | 10/2013 |

OTHER PUBLICATIONS

Pascal Froidevaux et al., "Use of Dipicolinate-Based Complexes for Producing Ion-Imprinted Polystyrene Resins for the Extraction of Yttrium-90 and Heavy Lanthanide Cations", Chem. Eur. J. 2006, 12, 6852-6864.

* cited by examiner

*Primary Examiner* — Fred Prince
(74) *Attorney, Agent, or Firm* — Oblon, McClelland, Maier & Neustadt, L.L.P.

(57) ABSTRACT

A rare earth adsorbent of an embodiment has a chelidonic acid monoamide group as a ligand, and contains a functional group represented by the following general formula (1):

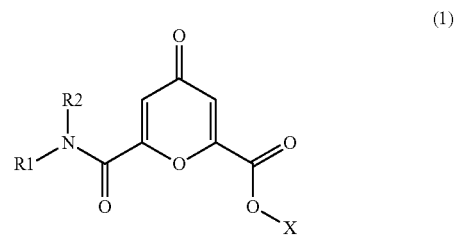

wherein: X is selected from hydrogen or an alkali metal; R1 is a bonding group with a simple polymer; and R2 is a functional group selected from hydrogen, an alkyl group, an alkenyl group, an alkynyl group, and an aryl group, and may be substituted by nitrogen or oxygen or contain a functional group containing the atoms in a side chain.

4 Claims, No Drawings

RARE EARTH ADSORBENT AND RARE EARTH ADSORPTION METHOD USING THE SAME

CROSS-REFERENCE TO RELATED APPLICATION

This application is based upon and claims the benefit of priority from the prior Japanese Patent Application No. 2015-006283, filed on Jan. 16, 2015, the entire contents of which are incorporated herein by reference.

FIELD

Embodiments of the present invention relate to a rare earth adsorbent and a rare earth adsorption method using the same.

BACKGROUND

Rare earth elements (15 elements such as yttrium, scandium, and lanthanide) are used for a permanent magnet, a fluorescent material, a glass abrasive, high refractive index glass, and a hydrogen storing alloy or the like. The rare earth elements are indispensable elements.

Although many rare earth elements exist in comparatively abundant resource amounts, concentrated minerals are unevenly distributed on the earth, and are not produced in Japan. The rare earths are heavy metals, and are harmful if the rare earths are emitted into the environment. For this reason, the rare earth elements are desirably reused from products or wastes.

Although high-concentration rare earth ions can be precipitated and removed by pH control or the like, low-concentration rare earth ions can be removed with the use of an ion-exchange resin or a chelating resin.

However, in these techniques, all the rare earths and heavy metals are precipitated, or adsorbed by a resin, which makes it difficult to reuse the rare earths.

It is known that a compound having a phosphate group can selectively adsorb rare earth ions. For example, it has been known that aluminum can be separated from cerium with the use of a rare earth adsorbent using carbamyl methylphosphoric acid.

A polymer obtained by subjecting a phosphate group to graft polymerization has been known. Patent Literature 1 discloses that milt having a phosphate group can be used as a rare earth adsorbent, and iron can be separated from neodymium and dysprosium which are rare earths. However, there is a problem that phosphorus itself may be depletion resource.

On the other hand, a metal selective adsorbent used in an ion imprint method has been known. Particularly, an erbium (Er) selective adsorbent containing 5,7-dichloro quinolone-8-ol and 4-vinyl pyridine as ligands, or the like has been known.

DETAILED DESCRIPTION

A rare earth adsorbent of an embodiment is a rare earth adsorbent containing a functional group represented by the following general formula (1):

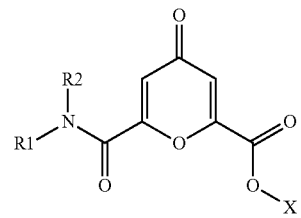

wherein: X is selected from hydrogen, an alkali metal or an ammonium; R1 is a bonding group with a simple polymer; and R2 is a functional group selected from hydrogen, an alkyl group, an alkenyl group, an alkynyl group, and an aryl group, and may be substituted by nitrogen or oxygen or contain a functional group containing the atoms in a side chain.

The rare earth adsorbent of the embodiment has chelidonic acid monoamide as an adsorption group, and can selectively adsorb rare earth elements.

In a rare earth recovering method using the rare earth adsorbent, rare earths can be selectively and efficiently recovered by setting the rare earths under a special pH condition.

(Rare Earth Adsorbent)

The rare earth adsorbent of the embodiment has chelidonic acid monoamide having a polymerizable functional group. A polymer obtained by subjecting the chelidonic acid monoamide having a polymerizable functional group to simple polymerization, a copolymer obtained by copolymerizing chelidonic acid monoamide with other monomer to embed the chelidonic acid monoamide into a base material, and a copolymer obtained by embedding a chelidonic acid monoamide ligand into a base material according to an ion imprint method can be appropriately selected.

The ion imprint method herein is a method for copolymerizing a monomer constituting a polymer serving as a base material with a metal complex having a polymerizable ligand, and embedding a ligand at preferable arrangement with respect to a specific metal element into the base material. Before the adsorbent is used, a part or all of the imprinted metal elements are removed.

The base material in the embodiment is preferably a homopolymer such as styrene, divinylbenzene, methyl methacrylate, methyl acrylate, acryl amide, isopropyl acryl amide, butoxymethylacrylamide, methylenebisacrylamide, acrylonitrile or butadiene, or a copolymer of the monomers. As described above, the monomers are copolymerized with a chelidonic acid monoamide monomer or a complex of a chelidonic acid monoamide monomer and metal to be recovered.

Among the above-described carriers, a cross-linked polymer and cross-linked copolymer containing divinylbenzene have a rigid structure, which are more preferable as the base material.

Metal ions are removed from a polymerized product by a strong acid or a chelating agent. The condition for using the chelating agent is preferably milder.

A ligand of an embodiment has a chelidonic acid monoamide structure represented by the general formula (1). X is selected from hydrogen, an alkali metal or an ammonium; R1 is a polymerizable functional group; R2 is a functional group selected from hydrogen, an alkyl group, an alkenyl group, an alkynyl group, and an aryl group, and may be substituted by nitrogen or oxygen or contain a functional group containing the atoms in a side chain. A balance between hydrophilicity and hydrophobicity can be kept by setting the number of carbon atoms of R2 to a suitable range, which can provide good ion adsorption performance. For example, an alkyl group, an alkenyl group, and an alkynyl group preferably have 1 to 12 carbon atoms. Similarly, the aryl group preferably has carbon atoms of 12 or less. A position in which a chelate complex with a metal ion is not formed is preferably substituted by nitrogen or oxygen.

In synthesis according to radical polymerization, the polymerizable functional group is selected from a styryl group and a styryl methyl group from the viewpoint of polymerization.

(Method for Producing Rare Earth Adsorbent)

Next, a method for producing a rare earth adsorbent of the present embodiment will be described in detail. However, a producing method to be described later is an example, and is not particularly limited as long as the rare earth adsorbent of the present embodiment is obtained. After each processing is performed, it is preferable that filtering is performed; washing is performed using pure water or alcohol or the like, followed by drying and performing the next processing.

First, a chelidonic acid monoamide monomer serving as a metal adsorption group is synthesized. For example, a chelidonic acid monoamide monomer in which R1 is a styryl group and R2 is hydrogen is obtained by condensation of p-amino styrene and chelidonic acid in a solvent using a 1-ethyl-3-(3-dimethylaminopropyl)carbodiimide hydrochloride salt (EDCI). The substitution position of an amino group may be any of an ortho position, a meta position, and a para position. A suitable substituent group can be introduced into R2 with the use of a secondary amine having a functional group besides a styryl group on an amino group. A BOP-based reagent, a benzotriazole-based reagent, and an uronium-based reagent besides a carbodiimide-based reagent can be used as a condensing agent. Although a solvent is based also on the selection of the condensing agent, methanol, ethanol, propanol, isopropanol, butanol, acetone, methyl ethyl ketone, ethyl acetate, acetonitrile, N,N-dimethylformamide (DMF), N,N-dimethylacetamide, dimethyl sulfoxide, N-methylpyrrolidone, chloroform, methylene chloride, and trichloroethylene or the like can be used. A chelidonic acid monoamide monomer having a styryl methyl group as a polymerizable functional group is obtained with the use of aminomethyl styrene. The substitution position of an aminomethyl group of aminomethyl styrene may be any of an ortho position, a meta position, and a para position.

The obtained monomer is polymerized by radical polymerization. A chelidonic acid monoamide monomer, a solvent, and a polymerization initiator are added. In copolymerization, the above-described monomer is also added. At this time, it is also possible to use a dispersion medium in place of using the solvent. It is possible to use the same solvent as that used for monomer synthesis as the solvent.

A peroxide and an azo compound can be used for the polymerization initiator. Specific examples thereof include benzoyl peroxide, tert-butyl hydroperoxide, 2,2'-azobis(isobutyronitrile) (AIBN), dimethyl 2,2'-azobis(isobutyrate), and 4,4'-azobis(4-cyano pentanoic acid).

A complex is synthesized with the use of the obtained monomer according to an imprint method. A complex is formed by adding a rare earth salt and a ligand of triple mole equivalence based on the rare earth salt into a solvent and stirring these. A base may be added for complex synthesis. Heating may be performed. It is also possible to remove the solvent after the complex is formed, to take out the complex. However, when the solvent is suitably selected, the complex is obtained as precipitation.

As the rare earth salt, a nitrate salt, a sulfate salt, a hydrochloride salt, a perchloric acid salt, and a trifluoromethyl sulfate salt or the like can be used. Among these, the nitrate salt has excellent solubility over a solvent, and is inexpensive, which is preferable.

As the base, sodium hydroxide, potassium hydroxide, lithium hydroxide, calcium hydroxide, barium hydroxide, sodium carbonate, potassium carbonate, and cesium carbonate or the like can be used. Among these, the alkali metal hydroxide has excellent solubility over a solvent, and is inexpensive, which is preferable.

As the solvent, methanol, ethanol, propanol, isopropanol, butanol, acetone, methyl ethyl ketone, ethyl acetate, acetonitrile, N,N-dimethylformamide, N,N-dimethylacetamide, dimethyl sulfoxide, and N-methylpyrrolidone or the like can be used. When a base is not added, chloroform, methylene chloride, and trichloroethylene or the like can also be used.

The obtained complex is copolymerized with the monomer of the base material by radical polymerization. The complex is measured in a reaction vessel, and the above-described monomer, solvent, and polymerization initiator are added thereto. As the solvent and the polymerization initiator, the same solvent and polymerization initiator as those used for synthesizing a non-imprint-based adsorbent can be used.

The obtained polymer is washed with a suitable solvent and dried, and imprint metal ions are then removed by a strong acid or a chelating agent. As the strong acid, a strong acid obtained by suitably diluting hydrochloric acid, sulfuric acid, nitric acid, or trifluoroacetic acid can be used. Examples of the chelating agent include ethylenediaminetetraacetic acid (EDTA), ethylenediamine disuccinic acid (EDDS), 1,4,7,10-tetraazacyclododecane-1,4,7,10-tetraacetic acid (DOTA), oxalic acid, or alkali metal salts thereof.

EXAMPLES

A method for recovering rare earth metals (ions) in the following Examples can be carried out on a significant scale but the method will be described in detail with a focus on description of a small-scale experimental apparatus for the sake of convenience of descriptions of a chemical reaction and function effect or the like.

Example 1

DMF (120 mL) was put into a three neck-flask (300 mL), and cooled to 10° C. in an ice-water bath while nitrogen bubbling was performed. After the bubbling was continued for 30 minutes, p-amino styrene (1.5 mL, 12 mmol) was added to the DMF, and completely dissolved. Chelidonic acid monohydrate (3.80 g, 19 mmol) and EDCI (3.62 g, 19 mmol) were added thereto, and these were stirred for 1 hour at 10° C. Then, the obtained reaction solution was returned to room temperature and stirred for 5 hours. After allowed to stand overnight, the reaction solution was stirred again for 4 hours and moved to a separating funnel. Ethyl acetate was added thereto, and these were washed with a 4.8% hydrobromic acid aqueous solution twice and washed with ion exchange water twice. An organic layer was extracted by a saturated sodium hydrogen carbonate aqueous solution three times, and washed with ethyl acetate. The obtained water layer was filtered to remove a solid. 48% hydrobromic acid was added by a smaller amount at a time while being stirred with a magnetic stirrer, to set the pH to 1 or less. The released yellow solid was recovered by suction filtration, sufficiently washed with ion exchange water, and dried under reduced pressure to obtain a chelidonic acid monoamide monomer (yield: 1.76 g, 50%).

$^1$H NMR (270 MHz, DMSO-$d_6$): δ10.65 (s, 1H), 7.71 (d, J=8.37 Hz, 2H), 7.51 (d, J=8.64 Hz, 2H), 7.07 (d, J=1.89 Hz, 1H), 6.99 (d, J=2.43 Hz, 1H), 6.72 (dd, J=17.6, 5.5 Hz, 1H), 5.80 (d, J=17.8, 1H), 5.24 (d, J=10.8 Hz, 1H).

$^{13}$C NMR (67 MHz, DMSO-d6): δ178.77, 160.67, 157.40, 156.50, 153.68, 137.18, 135.95, 133.70, 126.62, 120.64, 118.67, 116.54, 99.71

IR (KBr): 3492, 3359, 3275, 3097, 2450, 1914, 1720, 1649, 1602, 1534, 1512, 1404, 1356, 1316, 1253, 1124, 1098, 1003, 958, 936, 915, 883, 844, 797, 781, 638, 541, 507, 495, 466 cm$^{-1}$

The chelidonic acid monoamide monomer (286 mg, 1.0 mmol), AIBN (8.2 mg, 0.05 mmol) and DMF (3 mL) were put into a Schrenck tube (50 mL), and styrene (0.229 mL, 2.0 mmol) and divinylbenzene (0.280 mL, 2.0 mmol) were added thereto. Then, compressed degassing was performed five times, and nitrogen purge was performed to perform polymerization at 70° C. for 7 hours. Ethyl acetate was added to the obtained gel, and the gel was crushed with a glass rod. The crushed product was recovered by suction filtration, and washed with ethyl acetate and methanol in order of ethyl acetate and methanol. The obtained solid content was dried under reduced pressure to obtain an adsorbent of Example 1 as a yellow solid (yield: 374 mg, 50%). The following reaction formula [1] represents the chemical formula in the above-described producing process of the adsorbent. Particularly, a substance represented by the right-hand side chemical formula is a rare earth adsorbent of the present Example 1.

Reaction Formula [1]

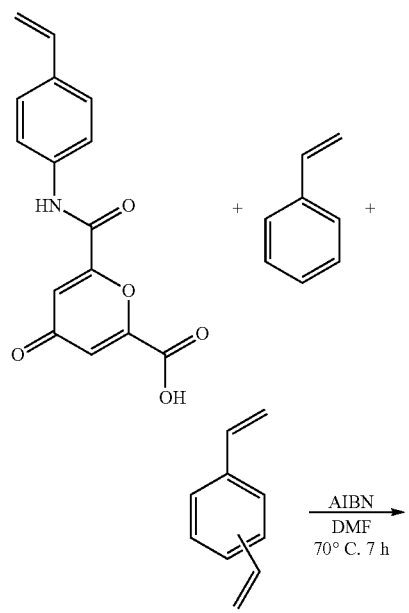

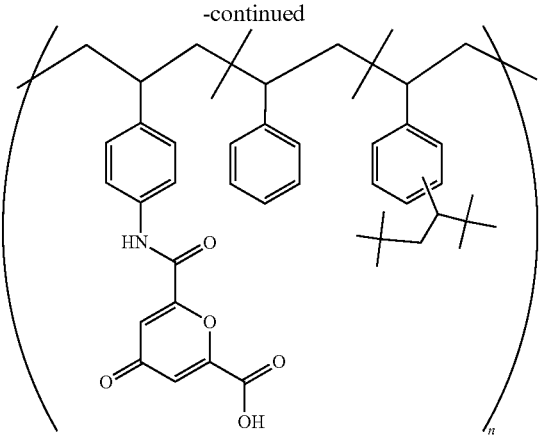

Example 2

Sodium hydroxide (84.7 mg, 2.1 mmol) was completely dissolved in methanol (30 mL). Then, the chelidonic acid monoamide monomer (571 mg, 2.0 mmol) obtained in Example 1 was added thereto, and these were stirred at room temperature to dissolve the chelidonic acid monoamide monomer. A solution of neodymium nitrate hexahydrate (293 mg, 0.67 mmol) in methanol (10 mL) was dropped thereto. After stirring was continued at room temperature for 30 minutes, the generated yellow precipitate was recovered by suction filtration, sufficiently washed with a small amount of methanol and ion exchange water, and washed with methanol again to replace water. Then, the precipitate was dried under reduced pressure to obtain a chelidonic acid monoamide neodymium complex (yield: 515 mg, 78%).

IR (KBr): 3355 (br), 3077, 1905, 1627, 1601, 1535, 1511, 1422, 1405, 1386, 1330, 1254, 1182, 1126, 1096, 1031, 1015, 990, 959, 940, 924, 841, 800, 756, 710, 547, 499, 484, 463 cm$^{-1}$.

The chelidonic acid monoamide neodymium complex (332 mg, 1.0 mmol), AIBN (8.2 mg, 0.05 mmol) and DMF (3 mL) were put into a Schrenck tube (50 mL), and styrene (0.229 mL, 2.0 mmol) and divinylbenzene (0.280 mL, 2.0 mmol) were added thereto. Then, compressed degassing was performed five times, and nitrogen purge was performed to perform polymerization at 70° C. for 7 hours. The obtained powder was recovered by filtration and washed with methanol. The powder was dried under reduced pressure to obtain a chelidonic acid monoamide-styrene-divinylbenzene copolymer as a yellow solid (yield: 627 mg, 78%).

IR (KBr): 3390 (br), 3083, 3024, 2923, 1633, 1601, 1533, 1511, 1492, 1416, 1379, 1324, 1254, 1115, 1017, 989, 956, 891, 833, 800, 759, 701, 538, 455 cm$^{-1}$.

A chelidonic acid monoamide neodymium complex-styrene divinylbenzene copolymer (550 mg) was put into a glass vial (20 mL). 6 M hydrochloric acid (20 mL) was added thereto, and these were stirred. After 2 hours, powder was recovered by suction filtration, and washed with water. The residue was again moved to the glass vial. A funnel and filter paper were washed with 6 M hydrochloric acid (20 mL), and the wash solution was moved to the vial. The solution was again stirred for 2 hours, and recovering and washing were then similarly performed. The solution was again stirred in 6 M hydrochloric acid for 2 hours. The powder was again and again recovered by suction filtration, and washed until it was neutralized with ion exchange water. The powder was then dried under reduced pressure to obtain an adsorbent of Example 2 (yield: 489 mg, 78%).

IR (KBr): 3408 (br), 3083, 3024, 2922, 1940, 1736, 1654, 1602, 1530, 1492, 1451, 1416, 1351, 1315, 1250, 1100, 1017, 990, 955, 938, 891, 832, 793, 759, 700, 535 $cm^{-1}$.

The following reaction formula [2] represents the chemical formula in the above-described producing process of the adsorbent. Particularly, a substance represented by the right-hand side chemical formula is a rare earth adsorbent of the present Example 2.

Comparative Example 1

AIBN (16.9 mg, 0.10 mmol) and DMF (6 mL) were put into a Schrenck tube (50 mL), and methacrylic acid (0.169 mL, 2.0 mmol), styrene (0.458 mL, 4.0 mmol), and divinylbenzene (0.560 mL, 4.0 mmol) were added thereto. Then, compressed degassing was performed five times, and nitrogen purge was performed to perform polymerization at 70° C. for 7 hours. After methanol was added to the obtained liquid having a high viscosity, and these were sufficiently stirred, a precipitate occurred. The precipitate was recovered by suction filtration and washed with methanol. The obtained solid content was dried under reduced pressure to obtain an adsorbent of Comparative Example 1 (yield: 572

Reaction Formula [2]

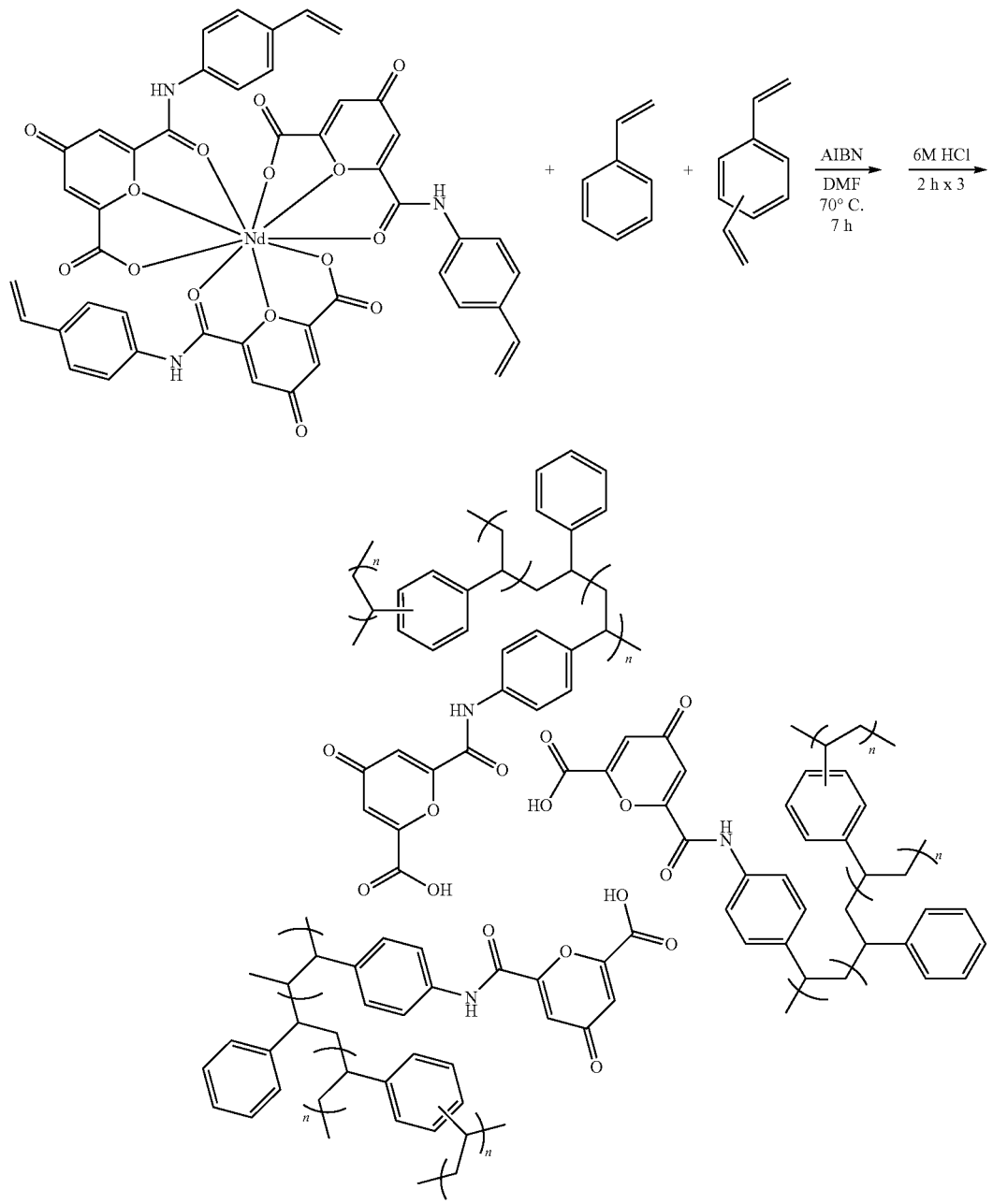

mg, 52%). The adsorbent has methacrylic acid (monocarboxylic acid) as an adsorption group.

Comparative Example 2

Maleic anhydride (197 mg, 2.0 mmol), AIBN (16.6 mg, 0.10 mmol), and DMF (6 mL) were put into a Schrenck tube (50 mL), and styrene (0.458 mL, 4.0 mmol) and divinylbenzene (0.560 mL, 4.0 mmol) were added thereto. Then, compressed degassing was performed five times, and nitrogen purge was performed to perform polymerization at 70° C. for 7 hours. Methanol was added to the obtained gel, and the gel was crushed with a glass rod. The crushed product was recovered by suction filtration, and washed with methanol. The obtained solid content was dried under reduced pressure to obtain a maleic anhydride-styrene-divinylbenzene copolymer (yield: 1.09 g, 96%).

The maleic anhydride-styrene-divinylbenzene copolymer (1.09 g) and 1M sulfuric acid (25 mL) were put into a flask, and these were stirred under reflux for 2 hours. The precipitate was recovered by suction filtration, and sufficiently washed with ion exchange water. The precipitate was dried under reduced pressure to obtain an adsorbent of Comparative Example 2 as a white solid (yield: 0.999 g). The adsorbent has maleic acid (dicarboxylic acid) as an adsorption group.

<Rare Earth Adsorption Test>

The operation effects of the adsorbents of the above-described Examples 1 and 2 were contrasted with the operation effect of the adsorbent of Comparative Example according to the following adsorption test, to collectively describe the advantages of the effects of Examples 1 and 2.

A standard solution containing metal ions was added into a 0.2 M ammonium acetate aqueous solution to prepare treated water containing 0.1 mM metal ions. A small amount of concentrated hydrochloric acid or concentrated ammonia water was added into the treated water to adjust the pH of the treated water. The actually prepared treated waters are aqueous solutions containing 0.1 mM of $Nd^{3+}$, $Dy^{3+}$, $Cu^{2+}$, $Co^{2+}$, and $Zn^{2+}$ and having pH's of 2, 3, 3.24, 3.50, 3.76, 4, 5.3, 6.8, 7.4, and 8. Since the metals may not be dissolve in an amount of 0.1 mM in a pH of 8, the aqueous solutions having adjusted pH and filtered through a 0.20 μm cellulose filter were used.

An adsorbent (Example 1, Comparative Example 1, 2: 50 mg, Example 2: 20 mg) was put into a glass vial (13.5 mL), and treated water (10 mL) was added thereto. Then, these were stirred in a mix rotor for 5 hours or more. After allowed to stand overnight as it is, the adsorbent was filtered by a syring filter (MiniSarto, pore diameter: 0.45 or 0.20 μm). The filtrate was diluted two-fold with ion exchange water to measure a residual metal concentration according to ICP-AES. The metal concentration of treated water before treating was similarly measured to calculate a Kd value and an SF value.

The definitions of the Kd value and SF value (neodymium standard) are as described by the following expressions (1) and (2).

$$Kd = \frac{C_{MO} - C_M}{C_{MO}} \times \frac{V}{m} \quad (1)$$

$$SF(Nd) = \frac{C_M}{C_{MO} - C_M} \times \frac{C_{Nd0} - C_{Nd}}{C_{Nd}} \quad (2)$$

Herein, $C_{MO}$ means a metal ion concentration before an adsorption test; $C_M$ means a metal ion concentration after an adsorption test; V means a volume [mL] of treated water; and m means an adsorbent weight [g]. Subscript M being Nd means a corresponding Nd ion concentration. As the Kd value is increased, the amount of adsorption is increased. It is considered that the SF value of 1 or more causes harder adsorption than that of Nd.

The results of the adsorption test using the adsorbent of Example 1 are summarized in Table (1).

TABLE (1)

| pH | Kd VALUE | | | | | SF(Nd) VALUE | | | |
|---|---|---|---|---|---|---|---|---|---|
| | Dy | Nd | Cu | Zn | Co | Dy | Cu | Zn | Co |
| 2.0 | NA | NA | NA | NA | NA | NA | NA | NA | NA |
| 3.0 | 310 | 320 | 110 | 22 | 16 | 1.0 | 2.9 | 15 | 20 |
| 4.0 | 6600 | 7900 | 530 | 120 | 94 | 1.2 | 15 | 66 | 84 |
| 5.3 | 1900 | 2400 | 480 | 250 | 220 | 1.3 | 5.0 | 9.6 | 11 |
| 6.8 | 1600 | 2100 | 700 | 290 | 240 | 1.3 | 3.0 | 7.3 | 9.0 |
| 7.4 | 1600 | 2200 | 830 | 320 | 250 | 1.3 | 2.6 | 6.8 | 8.7 |
| 8.0 | 554 | 935 | 461 | 318 | 158 | 1.6 | 1.1 | 1.6 | 2.2 |

NA: the Kd value is 1 or less, or the SF value cannot be determined.
All metals were not adsorbed in a pH of 2. Metals were not mostly dissolve in a pH of 9, and the adsorption test was not realized.

The results of the adsorption test using the adsorbent of Example 2 are summarized in Table (2).

TABLE (2)

| pH | Kd VALUE | | | | | SF(Nd) VALUE | | | |
|---|---|---|---|---|---|---|---|---|---|
| | Dy | Nd | Cu | Zn | Co | Dy | Cu | Zn | Co |
| 2.0 | 27 | 47 | 27 | 2 | 8 | 1.6 | 1.5 | 17 | 5.5 |
| 3.0 | 36 | 20 | 91 | 35 | 19 | 0.86 | 0.28 | 0.82 | 1.6 |
| 3.24 | 1150 | 1184 | 467 | 98 | 80 | 1.03 | 2.5 | 12 | 15 |
| 3.50 | 6633 | 6538 | 530 | 98 | 84 | 0.99 | 12 | 67 | 78 |
| 3.76 | 21467 | 20208 | 688 | 143 | 125 | 0.94 | 29 | 142 | 162 |
| 4.0 | 9400 | 9800 | 610 | 170 | 160 | 1.0 | 16 | 57 | 61 |
| 5.3 | 3600 | 4600 | 390 | 190 | 210 | 1.3 | 12 | 25 | 22 |
| 6.8 | 2300 | 2800 | 390 | 150 | 150 | 1.3 | 7.4 | 19 | 19 |
| 7.4 | 810 | 990 | 160 | 64 | 56 | 1.2 | 6.3 | 16 | 18 |
| 8.0 | 1318 | 1647 | 467 | 109 | 155 | 1.3 | 3.53 | 15 | 11 |

Also in Table 2, all metals were not adsorbed in a pH of 2 in the same manner as in the case described in the above Table 1. Metals were not mostly dissolve in a pH of 9, and the adsorption test was not realized.

The results of the adsorption test using the adsorbent of Comparative Example 1 are summarized in Table (3).

TABLE (3)

| | Kd VALUE | | | | | SF(Nd) VALUE | | | |
|---|---|---|---|---|---|---|---|---|---|
| pH | Dy | Nd | Cu | Zn | Co | Dy | Cu | Zn | Co |
| 3.0 | NA | 2 | 2 | NA | NA | NA | 1.1 | NA | NA |
| 4.0 | 4 | 3 | 2 | NA | 2 | 0.74 | 1.4 | 2.3 | 2.0 |
| 5.3 | NA | NA | 2 | 6 | 3 | NA | NA | NA | NA |
| 6.8 | 6 | 2 | 10 | 12 | NA | 0.45 | 0.21 | 0.19 | NA |
| 7.4 | 25 | 8 | 19 | 33 | NA | 0.30 | 0.14 | 0.20 | NA |

NA: the Kd value is 1 or less, or the SF value cannot be determined.

The results of the adsorption test using the adsorbent of Comparative Example 2 are summarized in Table (4).

TABLE (4)

| | Kd VALUE | | | | | SF(Nd) VALUE | | | |
|---|---|---|---|---|---|---|---|---|---|
| pH | Dy | Nd | Cu | Zn | Co | Dy | Cu | Zn | Co |
| 3.0 | NA | 2 | 4 | NA | NA | NA | 0.43 | NA | NA |
| 4.0 | 8 | 8 | 9 | 5 | NA | 0.97 | 0.85 | 1.5 | NA |
| 5.3 | 39 | 41 | 90 | 39 | 12 | 1.1 | 0.46 | 1.1 | 3.3 |
| 6.8 | 368 | 374 | 2115 | 683 | 135 | 1.0 | 0.18 | 0.55 | 2.8 |
| 7.4 | 148 | 143 | 835 | 258 | 63 | 0.97 | 0.52 | 0.74 | 1.7 |

Herein, NA means data in which the Kd value is 1 or less, or the SF value cannot be determined.

From Tables 1 and 2, it was found that rare earth ions can be selectively adsorbed in the pH range of 3.0 or more and 8.0 or less in Example 1. In a pH of 2, all metal ions are not mostly adsorbed. In the pH range of more than 8.0, the solubility of metal ions is remarkably decreased, and thereby adsorption cannot be performed. On the other hand, in Example 2, the rare earth ions can be adsorbed in the pH range of 2.0 to 8.0, but rare earth selectivity is lost in a pH of 3, and the rare earth ions can be selectively adsorbed again in a pH of 2. However, the Kd value is small in a pH of 3 or less, and the amount of adsorption is few. From the viewpoint of both the selectivity and the amount of adsorption, it was found that the rare earth ions can be efficiently and selectively adsorbed, particularly, in the pH range of 3.24 or more and 7.4 or less. The adsorption test result is considered to be the competitive result of the adsorption of the ammonium ions contained in the solution to the adsorption site and the coordination of the acetate ions to the metal ions, or the like, but the detail thereof has not been known at present. Since Example 2 is synthesized using an imprint method, the selectivity of the rare earth ions is increased in a larger pH region than that of Example 1. However, in a pH of 4, the selectivity of Zn and Co is slightly decreased, and the Kd value and the SF (Nd) value are also smaller than those of Example 1 in a pH of 3.0. In both Examples 1 and 2, in a pH of about 4, the Kd value was specifically increased. More interestingly, the SF (Nd) value was also similarly increased. On the other hand, in a pH of 3, the Kd value and the SF value were largely decreased.

When focused on the ion radius (Shannon radius (Non-Patent Literature)) of the metal ion, it is found that $Dy^{3+}$ 102.7 pm (eight-coordination), $Nd^{3+}$ 116.3 pm (nine-coordination), $Cu^{2+}$ 73 pm (six-coordination), $Zn^{2+}$ 74 pm (six-coordination), and $Co^{2+}$ 74.5 pm (high spin, six-coordination) are set, and the ion radius of rare earth is largely different from that of a transition metal. That is, it is considered that a rare earth ion can be separated from a transition metal ion since the ion radius of the rare earth ion is largely different from the ion radius of the transition metal ion. It is considered that the SF (Nd) value of Dy is about 1 in any pH and the ion sizes of the rare earth ions hardly change, which makes it impossible to separate the rare earth ion from the transition metal ion.

In the case of methacrylic acid (Comparative Example 1) or maleic acid (Comparative Example 2), it was found that the Kd value of the rare earth is small. In particular, in the case of methacrylic acid, the transition metal is also hardly adsorbed. It was found that the maleic acid having a chelate structure can adsorb rare earth ions in a pH of 4 or more, but the maleic acid is copper-selective also in any pH.

On the other hand, as apparent from Tables 3 and 4, it was found that, in the absorbents of Comparative Examples 1 and 2, the recovered amounts of Dy and Nd are approximately the same as those of Cu, Zn, and Co, or the recovered amounts of the rare earth metals are less, which makes it impossible to selectively recover the rare earth metals.

As described above, it was found that simple monocarboxylic acid and dicarboxylic acid have no rare earth selectivity, and the chelidonic acid monoamide group contributes to the selective adsorption of the rare earths from the adsorption characteristics of Examples 1 and 2 and Comparative Examples 1 and 2.

What is claimed is:

1. A rare earth adsorbent comprising a functional group represented by the following general formula (1):

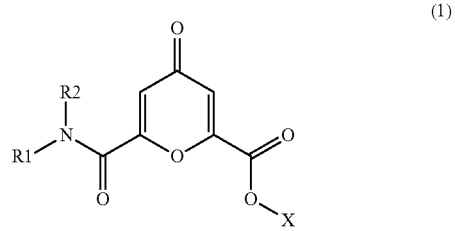

wherein:

X is selected from hydrogen, an alkali metal or an ammonium;

R1 is a bonding group with a simple polymer; and

R2 is a functional group selected from hydrogen, an alkyl group, an alkenyl group, an alkynyl group, and an aryl group, and may be substituted by nitrogen or oxygen or contain a functional group containing the atoms in a side chain.

2. The rare earth adsorbent according to claim 1, wherein the functional group represented by the general formula (1) is introduced as a side chain of a polymer.

3. A rare earth adsorption method comprising:

adjusting a pH of an aqueous solution containing a rare earth metal to 3 or more and 8 or less; and selectively recovering the rare earth metal using a rare earth adsorbent containing a functional group represented by the following general formula (1):

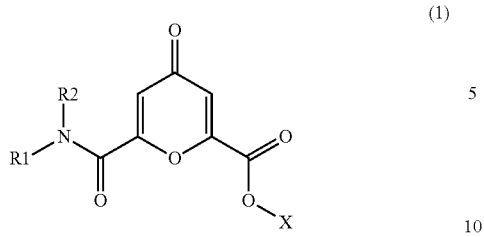

(1)

wherein:
X is selected from hydrogen, an alkali metal or an ammonium;
R1 is a bonding group with a simple polymer; and
R2 is a functional group selected from hydrogen, an alkyl group, an alkenyl group, an alkynyl group, and an aryl group, and may be substituted by nitrogen or oxygen or contain a functional group containing the atoms in a side chain.

4. The rare earth adsorption method according to claim 3, wherein a pH of the aqueous solution is adjusted to 3.24 or more and 7.4 or less.

* * * * *